United States Patent
Plantier et al.

(10) Patent No.: US 10,656,332 B2
(45) Date of Patent: May 19, 2020

(54) MULTI-SPECTRAL OPTICAL COUPLER WITH LOW RECEIVE LOSSES

(71) Applicant: COMMISSARIAT A L'ENERGIE ATOMIQUE ET AUX ENERGIES ALTERNATIVES, Paris (FR)

(72) Inventors: Simon Plantier, Grenoble (FR); Marco Casale, Grenoble (FR); Daivid Fowler, Saint Martin le Vinoux (FR); Christophe Kopp, Fontanil Cornillon (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/321,147

(22) PCT Filed: Jul. 31, 2017

(86) PCT No.: PCT/FR2017/052149
§ 371 (c)(1),
(2) Date: Jan. 28, 2019

(87) PCT Pub. No.: WO2018/024975
PCT Pub. Date: Feb. 8, 2018

(65) Prior Publication Data
US 2019/0170938 A1    Jun. 6, 2019

(30) Foreign Application Priority Data

Aug. 1, 2016 (FR) ..................... 16 57450

(51) Int. Cl.
*G02B 6/12* (2006.01)
*G02B 6/30* (2006.01)
(Continued)

(52) U.S. Cl.
CPC ..... *G02B 6/12004* (2013.01); *G02B 6/12002* (2013.01); *G02B 6/12007* (2013.01);
(Continued)

(58) Field of Classification Search
CPC ... G02B 6/30; G02B 6/34; G02B 6/43; G02B 6/12007; G02B 2006/12107; G02B 6/12002
See application file for complete search history.

(56) References Cited

U.S. PATENT DOCUMENTS

| 5,544,268 A | 8/1996 | Bischel et al. |
| 5,664,032 A | 9/1997 | Bischel et al. |

(Continued)

FOREIGN PATENT DOCUMENTS

FR    2 922 031    4/2009

OTHER PUBLICATIONS

U.S. Appl. No. 16/110,757, filed Aug. 23, 2018, Karim Hassan, et al.

(Continued)

*Primary Examiner* — Ellen E Kim
(74) *Attorney, Agent, or Firm* — Oblon, McClelland, Maier & Neustadt, L.L.P.

(57) ABSTRACT

An optical coupling device for producing an optical coupling between an optical fiber and photonic circuits. The device includes a substrate and at least two coupling stages integrated on the substrate, and: each coupling stage includes a grating coupler configured to implement an optical coupling centered on a respective central wavelength; the multiple grating couplers are superimposed on top of each other, along an axis orthogonal to the substrate plane; at least one of the grating couplers is insensitive to polarization. The device can form, for example, a wide band coupler, wherein each portion of the spectrum is coupled by (Continued)

a coupling stage. As an alternative, such a device can form an emitting and receiving coupler, where emission and reception spectra are each coupled by a respective coupling stage.

16 Claims, 4 Drawing Sheets

(51) Int. Cl.
*G02B 6/34* (2006.01)
*G02B 6/43* (2006.01)

(52) U.S. Cl.
CPC ............... *G02B 6/30* (2013.01); *G02B 6/34* (2013.01); *G02B 6/43* (2013.01); *G02B 2006/12107* (2013.01)

(56) References Cited

U.S. PATENT DOCUMENTS

| | | | |
|---|---|---|---|
| 5,912,997 A | 6/1999 | Bischel et al. | |
| 5,978,524 A | 11/1999 | Bischel et al. | |
| 6,078,704 A | 6/2000 | Bischel et al. | |
| 6,118,908 A | 9/2000 | Bischel et al. | |
| 6,141,465 A | 10/2000 | Bischel et al. | |
| 6,522,794 B1 | 2/2003 | Bischel et al. | |
| 9,042,691 B2 * | 5/2015 | Kang | G02B 6/34 385/14 |
| 9,192,307 B2 * | 11/2015 | Bates | A61B 5/0097 |
| 10,168,481 B2 | 1/2019 | Verslegers et al. | |
| 2001/0046352 A1 * | 11/2001 | Ohta | G02B 6/02085 385/50 |
| 2010/0265504 A1 * | 10/2010 | Kopp | G02B 6/12002 356/364 |
| 2013/0121639 A1 * | 5/2013 | Shimizu | G02B 6/12002 385/37 |
| 2014/0010498 A1 | 1/2014 | Verslegers et al. | |
| 2014/0321493 A1 * | 10/2014 | Matsumoto | B82Y 20/00 372/50.11 |
| 2014/0323323 A1 * | 10/2014 | Cunningham | G01N 21/648 506/9 |
| 2015/0309261 A1 * | 10/2015 | Kobyakov | G02B 6/305 385/14 |

OTHER PUBLICATIONS

International Search Report dated Nov. 7, 2017 in PCT/FR2017/052149 filed Jul. 31, 2017.

Xu, L. et al., "Bi-wavelength two dimensional chirped grating couplers for low cost WDM PON transceivers," Optics Communications, No. 284, Jan. 5, 2011, pp. 2242-2244.

Xiao, Z. et al., "Mode Control in Planar Waveguide Grating Couplers With Double Surface Corrugation," IEEE Photonics Technology Letters, vol. 24, No. 19, Oct. 1, 2012, pp. 1722-1725.

Song, J.H. et al., "Polarization-independent nonuniform grating couplers on silicon-on-insulator," Optics Letters, vol. 40, No. 17, Sep. 1, 2015, pp. 3941-3944.

\* cited by examiner

MULTI-SPECTRAL OPTICAL COUPLER WITH LOW RECEIVE LOSSES

TECHNICAL FIELD

The field of the invention is that of integrated photonic circuits, intended to be coupled to one or more optical fibres.

The invention more particularly relates to an optical grating coupler, for producing an optical coupling between the one or more optical fibre(s) and said photonic circuits. The optical grating coupler is integrated, with the photonic circuits, on a same substrate.

The invention in particular applies to the sector of optical telecommunications and networks for data transmission.

PRIOR ART

Numerous embodiments of an optical grating coupler are known in the prior art.

This invention more particularly concerns optical couplers suitable for the coupling of a plurality of spectrum portions.

For this purpose, an optical grating coupler is known and comprises a single diffraction grating, formed by holes distributed in space over two dimensions.

In to a first dimension, the holes of the grating are regularly spaced apart, according to a pitch $\Lambda_x$.

In a second dimension, the holes of the grating are regularly spaced apart, according to a pitch $\Lambda_y$ that is different from $\Lambda_x$.

Each pitch $\Lambda_x$ or $\Lambda_y$ corresponds to a central coupling wavelength $\lambda_x$ or $\lambda_y$ respectively.

The diffraction grating is square-shaped.

A waveguide extends over a first side of the square, said waveguide being configured so as to guide a signal at the wavelength $\lambda_x$.

A waveguide extends over a second side of the square, said waveguide being configured so as to guide a signal at the wavelength $\lambda_y$.

The optical coupler thus produces an optical coupling of the TE mode at the wavelength $\lambda_x$, and of the TE mode at the wavelength $\lambda_y$.

It is reminded that, in an optical circuit formed in a given plane, the following terms are usually employed:
  transverse electric or TE mode, designating a mode of propagation such that the electric field is orthogonal to the direction of propagation and parallel to the plane of the circuit, whereby the TE mode corresponds to a first fundamental state of polarisation; and
  transverse magnetic or TM mode, designating a mode of propagation such that the electric field is orthogonal to the plane of the circuit, whereby the TM mode corresponds to a second fundamental state of polarisation.

Such an optical coupler is described, for example, in the article entitled "*Bi-wavelength two-dimensional chirped grating couplers for low cost WDM PON transceivers*", Lin Xu & al., Optics Communications 284 (2011) 2242-2244.

Such an optical coupler is sensitive to polarisation since, for each wavelength, it only processes one of the two polarisations.

Such an optical coupler is intended for the optical coupling of an optical fibre with photonic circuits integrated onto a substrate.

Thus, it can function properly only under very strict conditions. In particular, it can correctly transfer a signal from the optical fibre to the photonic circuits only if the polarisation of this signal is controlled (for example via a polarisation-maintaining fibre, or via a conventional optical fibre used with a polarisation controller).

However, in the data transmission networks commonly used in practice, in particular in the telecommunications sector, the polarisation of the signal is not controlled. In other words, the state of polarisation of a signal to be transferred from an optical fibre to photonic circuits is unknown and/or unstable (variable).

One purpose of this invention is thus to propose an optical coupler suitable for coupling different wavelengths and not having the drawbacks of the prior art.

In particular, it concerns proposing an optical coupler suitable for coupling different wavelengths, having high performance levels, even for the transfer, from an optical fibre to photonic circuits, of a signal the state of polarisation whereof is unknown and/or unstable.

DESCRIPTION OF THE INVENTION

This purpose is achieved using an optical coupling device for producing an optical coupling at at least two central wavelengths between an optical fibre and photonic circuits.

According to the invention, the optical coupling device comprises a substrate and at least two coupling stages integrated onto said substrate, wherein:
  each coupling stage comprises, integrated onto the substrate, a grating coupler and at least one waveguide, the grating coupler being arranged at the input or output of the at least one waveguide and configured for implementing an optical coupling centred on a respective central wavelength;
  the several grating couplers are superimposed on top of one other; and
  at least one of the grating couplers is a grating coupler insensitive to polarisation.

The several grating couplers are integrated onto the substrate. In other words, they each extend above the substrate, in planes parallel to the planes of the substrate, in particular parallel to the plane of the upper surface of the substrate. Stated in yet another way, the planes along which the grating couplers extend are orthogonal to a straight line normal to the substrate.

Throughout the text of this invention, the term "above" refers to a vertical axis orthogonal to the plane of the substrate.

The several grating couplers are superimposed on top of one other. In other words, the several grating couplers are superimposed along a straight line normal to the substrate, in particular a straight line normal to the upper surface of the substrate.

Preferably, the centres of the grating couplers are aligned along a straight line normal to the substrate, in particular a straight line normal to the upper surface of the substrate.

Each grating coupler insensitive to polarisation is thus arranged at the input or output of one or two waveguides, jointly dedicated to guiding the two polarisations of a signal travelling in the optical fibre, in particular a signal arriving from the optical fibre.

Each grating coupler insensitive to polarisation can more particularly be arranged at the input or output of two waveguides, or at the input or output of a single multi-mode waveguide.

In particular, each grating coupler insensitive to polarisation can be arranged at the input or output of two waveguides, preferably single-mode waveguides, whereby each waveguide is dedicated to guiding a different polarisation of a signal travelling in the optical fibre, in particular a signal arriving from the optical fibre. This preferably concerns two TE waveguides (suitable for guiding the TE mode of a signal in the waveguide). It can also concern two TM waveguides (suitable for guiding the TM mode of a signal in the waveguide). It can also concern one TE waveguide and one TM waveguide, in particular when the grating coupler insensitive to polarisation is not a grating coupler having a periodicity of the order of two. It should be noted that the state of polarisation in the waveguide does not necessarily correspond to the state of polarisation in the optical fibre. The two waveguides can each guide the same type of polarisation (TE or TM respectively), corresponding to the guiding of the two polarisations of a signal considered at the level of the optical fibre.

Alternatively, each grating coupler insensitive to polarisation can be arranged at the input or output of a single multi-mode waveguide.

During operation, one or more optical fibre(s) are arranged above the stack of grating couplers. It is thus implied that the axis of each optical fibre is not parallel to the planes of the substrate and of the grating couplers. One injection end of each optical fibre is more particularly considered in this case.

Preferably, a single optical fibre is arranged above the stack of grating couplers.

The one or more optical fibre(s) carry an optical signal, or a plurality of optical signals, corresponding to a plurality of spectrum portions each of which is centred on a given central wavelength.

The idea on which the invention is based involves superimposing different coupling stages, each of which is dedicated to one of said spectrum portions.

Each grating coupler is thus arranged so as to produce an optical coupling of a single one of said spectrum portions, i.e. an optical coupling at a single central wavelength.

Thus, each grating coupler can be a standard grating coupler, having optimal coupling properties, in particular a low loss factor. For example, each grating coupler can be formed using standard materials such as silicon and silicon dioxide.

A grating coupler insensitive to polarisation is used for at least one of the stages. Such a grating coupler is suitable for coupling, for a predetermined central wavelength, a first polarisation in a first path and a second polarisation in a second path. Each path corresponds to a waveguide integrated onto the substrate at the height of the grating coupler. For said predetermined central wavelength, the optical coupling device thus has high performance levels, even for the transfer, from an optical fibre to photonic circuits, of a signal, the state of polarisation whereof is unknown and/or unstable.

An optical coupling device is thus produced, suitable for coupling different central wavelengths and having, for one or more of said central wavelengths, high performance levels, even for the transfer, from an optical fibre to photonic circuits, of a signal, the state of polarisation whereof is unknown and/or unstable. In particular, the optical coupling device has high performance levels, even with optical fibres different from polarisation-maintaining optical fibres, and without the need for ancillary polarisation control devices.

Moreover, the stacked geometry, with each stage being dedicated to a single central wavelength, further simplifies the arrangement of the photonic circuits connected to the optical coupling device according to the invention. The photonic circuits can in particular also be arranged in a plurality of stages, whereby each stage is dedicated to a single central wavelength.

The invention procures a wide range of modular possibilities in the choice of central wavelengths that can be coupled by the optical coupling device, whereby the different coupling stages are independent from one another.

Moreover, the number of central wavelengths that can be coupled is not limited, since the stack can comprise as many superimposed coupling stages as desired.

The invention thus proposes a highly-modular transmission spectrum for the optical coupling device.

The invention allows the compactness of the photonic circuits to be improved, in particular of nano-photonic circuits, by proposing a large operating wavelength range, and retains an advantageous vertical coupling structure (with optical fibre above).

The operating wavelength range can be formed in one piece, or by a plurality of discrete portions. The device can in particular form a wide band coupler, where each portion of the spectrum is coupled by a coupling stage, or an emitting and receiving coupler, where the emission and reception spectra are each coupled by a respective coupling stage.

Preferably, the device according to the invention further comprises a so-called initial interlayer and/or at least one so-called intermediate interlayer, whereby the initial interlayer extends between the substrate and an immediately neighbouring coupling stage, and each intermediate interlayer extends between two coupling stages.

Each interlayer can have a thickness greater than 300 nm.

Each interlayer is advantageously made of silica.

Advantageously, the coupling stage situated the closest to the substrate has an apodised grating coupler, and the coupling stage situated the furthest from the substrate has a non-apodised grating coupler.

Preferably, each coupling stage is associated with a respective maximum of the transmission rate of the optical coupling implemented by the corresponding grating coupler, and for at least one pair of two coupling stages, the difference between the corresponding respective maxima is less than 1 dB.

According to a first embodiment, the device according to the invention comprises two coupling stages from the group consisting of:
a first coupling stage comprising a first grating coupler insensitive to polarisation, associated with a first central wavelength and a first maximum of the transmission rate of the optical coupling implemented by said grating coupler; and
a second coupling stage comprising a second grating coupler insensitive to polarisation, associated with a second central wavelength and a second maximum of the transmission rate of the optical coupling implemented by said grating coupler;
the difference between the first and second central wavelengths being less than or equal to 100 nm, and the difference between the first and the second maximum of the transmission rates being less than or equal to 1 dB, the optical coupling device thus forming a wide band coupler insensitive to polarisation with a bandwidth at −1 dB that is greater than or equal to 50 nm.

According to a second embodiment, the device according to the invention comprises two coupling stages from the group consisting of:
a first coupling stage comprising a first grating coupler insensitive to polarisation, and associated with a first central wavelength; and a second coupling stage comprising a second grating coupler sensitive to polarisation, and associated with a second central wavelength;

the difference between the first and second central wavelengths being greater than or equal to 130 nm.

Preferably, the first central wavelength lies in the range 1,540 to 1,560 nm, and the second central wavelength lies in the range 1,300 to 1,320 nm.

The number of coupling stages is advantageously equal to two.

The invention further relates to an optical system comprising, integrated onto the same substrate, an optical coupling device according to the invention and photonic circuits, wherein the photonic circuits are arranged in a plurality of superimposed processing stages, and wherein to each coupling stage of the optical coupling device corresponds a processing stage.

The system according to the invention can be a system wherein the optical coupling device is a device according to the first embodiment of the invention, and wherein:

the first coupling stage is arranged at the input of a first processing stage, configured so as to process a signal centred on the first central wavelength and received by the system via the optical coupling device; and the second coupling stage is arranged at the input of a second processing stage, configured so as to process a signal centred on the second central wavelength and received by the system via the optical coupling device.

Such a system can further comprise a single emitting and receiving fibre, configured so as to transmit a broadband signal to the photonic circuits via the optical coupling device, said broadband signal being formed by the signal centred on the first central wavelength and the signal centred on the second central wavelength.

Alternatively, the system according to the invention can be a system wherein the optical coupling device is a device according to the second embodiment of the invention, and wherein:

the first coupling stage is arranged at the input of a first processing stage, configured so as to process a signal centred on the first central wavelength and received by the system via the optical coupling device; and the second coupling stage is arranged at the output of a second processing stage, configured so as to process a signal centred on the second central wavelength and intended to be emitted by the system via the optical coupling device.

Such a system can further comprise a single emitting and receiving fibre, configured so as to:

transmit the signal centred on the first central wavelength to the first processing stage via the optical coupling device; and receive the signal centred on the second central wavelength from the second processing stage via the optical coupling device.

BRIEF DESCRIPTION OF THE FIGURES

This invention will be better understood after reading the following description of example embodiments, given for purposes of illustration only and not intended to limit the scope of the invention, and with reference to the accompanying figures, wherein.

DETAILED DESCRIPTION OF THE SPECIFIC EMBODIMENTS

Figure 1A:
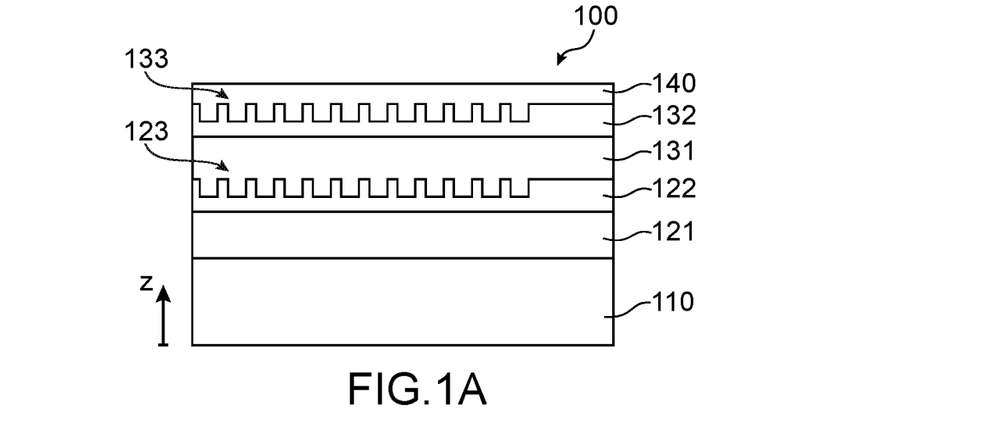
FIGS. 1A to 1C show a first embodiment of an optical coupling device according to the invention.
Figure 1B:
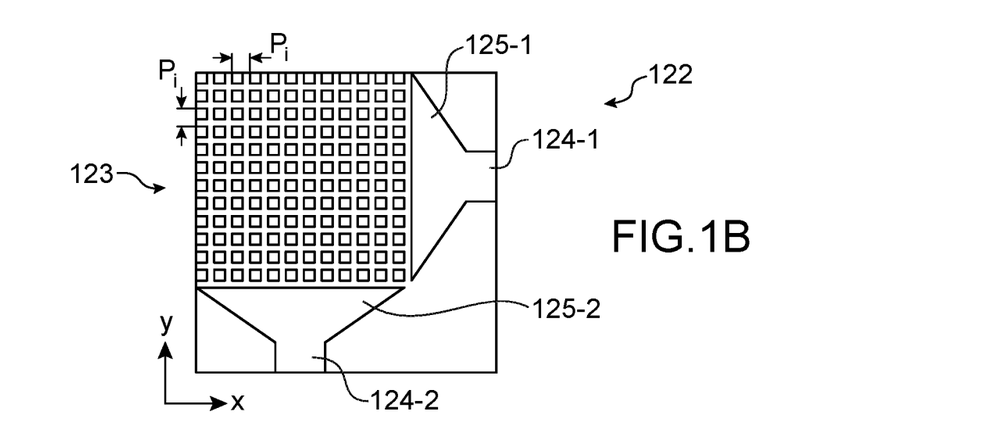
Figure 1C:
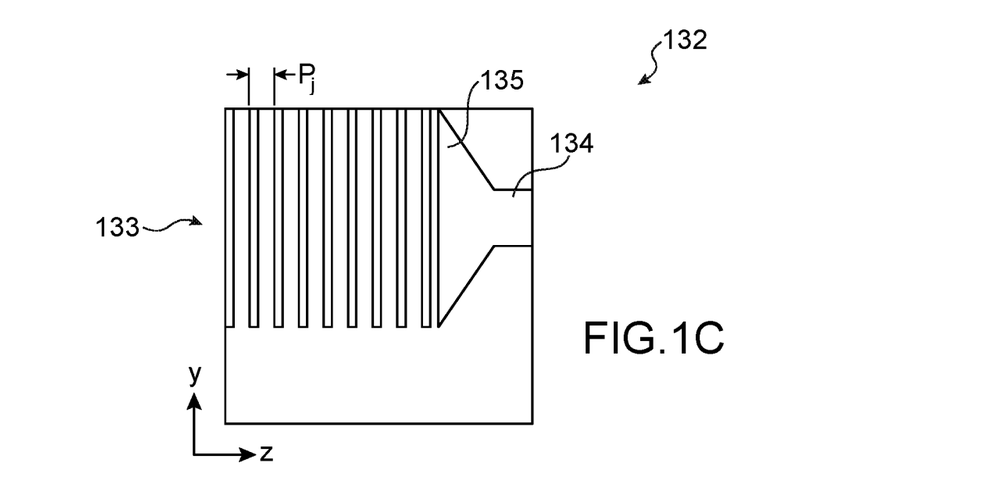

With reference to FIGS. 1A to 1C, a first embodiment of an optical coupling device 100 according to the invention is firstly described.

In FIG. 1A, the optical coupling device 100 is shown in a sectional view.

The optical coupling device 100 in this case comprises, directly superimposed on top of one another:

a substrate 110, in particular a silicon substrate;

a first so-called interlayer 121, in this case made of silica ($SiO_2$), arranged directly on the substrate;

a first coupling layer 122, arranged directly on the first interlayer 121, and in which a first diffraction grating 123 is etched, referred to as a first grating coupler;

a second so-called interlayer 131, in this case made of silica ($SiO_2$), arranged directly on the first coupling layer 122;

a second coupling layer 132, arranged directly on the second interlayer 131, and in which a second diffraction grating 133 is etched, referred to as a second grating coupler; and where necessary an encapsulating layer 140, directly covering the second coupling layer 132.

All of the coupling layers 122, 132 can be made of the same material, for example silicon, or silicon nitride ($Si_xN_y$ or $Si_xN:H$).

Alternatively, all of the coupling layers are not made of the same material, whereby one can be made of silicon and the other of silicon nitride, for example.

Each coupling layer 122, respectively 132, is etched to form recesses. These recesses are filled with the material of the layer directly covering said coupling layer, in this case the material of the second interlayer 131, respectively of the encapsulating layer 140.

In each coupling layer 122, respectively 132, the etching forms the grating coupler 123, respectively 133, and at least one waveguide at the input/output of this grating coupler.

In this case, each coupling layer 122, respectively 132 has a thickness of 300 nm, with an etching depth of 150 nm. This example is not limiting.

The "coupling stage" denotes the coupling layer 122, respectively 132, the etched recesses whereof are filled with the material of the layer situated above. Each coupling layer 122, respectively 132, receives a grating coupler and at least one waveguide.

These coupling stages 122 and 132 are all integrated onto the substrate 110, i.e. formed in one or more layer(s) of material(s) deposited on the substrate.

The coupling stages are superimposed on top of one another, separated in this case by the interlayer 131, referred to as the "intermediate interlayer". Each intermediate interlayer preferably extends directly between two coupling stages.

The interlayer 121 that separates the substrate and the first coupling stage is more particularly referred to as the "initial interlayer". The initial interlayer 121 preferably extends directly between the substrate and the first coupling stage.

The grating couplers 123 and 133 are aligned one above the other. In particular, the grating couplers advantageously have the same length and the same width, and are jointly aligned along the axis of the height (z).

FIG. 1B shows, in an overhead view, the first coupling layer 122.

This layer comprises the grating coupler 123, configured so as to implement the optical coupling of a signal centred on a first central wavelength.

The grating coupler 123 is, in this case, a grating coupler insensitive to polarisation.

It is constituted in this case by a series of patterns distributed according to a square mesh, i.e. with a periodicity of the order two, and according to a distribution pitch $P_i$ that is identical in the two dimensions of the plane.

The patterns are, in this case, holes in the first coupling layer 122 (filled with the material of the interlayer 131).

In this case, the holes have a square cross-section.

This shape of the holes is not intended to limit the invention and numerous other shapes can be implemented without leaving the scope of the invention, for example holes having a circular cross-section.

The grating coupler 123 advantageously has a rectangular or square shape, in this case a square shape.

A first waveguide 124-1 extends orthogonally to one of the sides of this square, halfway along this side of the square.

A second waveguide 124-2 extends orthogonally to another of the sides of the square, halfway along this other side of the square, and orthogonally to the first waveguide 124-1.

An adaptor 125-1, respectively 125-2, commonly called a "taper" extends between the grating coupler 123 and one end of the waveguide 124-1, respectively 124-2.

The adaptor 125-1, respectively 125-2, has a width that gradually decreases from the side thereof adjacent to the grating coupler 123 to the side thereof adjacent to the waveguide 124-1, respectively 124-2.

The grating coupler 123, the waveguides 124-1, 124-2 and the adaptors 125-1, 125-2 are each formed by etching the first coupling layer 122, and filling the etched spaces with the material of the interlayer 131.

The grating coupler 123 as described in this case is a grating coupler that is insensitive to polarisation, in that it is suitable for simultaneously coupling the two polarisations of the signal centred on the first central wavelength (polarisations considered at the level of an optical fibre arranged above the grating coupler). A first polarisation circulates in the waveguide 124-1, the other polarisation circulates in the waveguide 124-2, the two waveguides 124-1 and 124-2 being formed in the same coupling stage as the grating coupler 123.

Numerous known alternative embodiments of a grating coupler insensitive to polarisation can be implemented without leaving the scope of the invention.

In particular, a grating coupler insensitive to polarisation as described in the patent application US 2014/0010498 can be cited. This patent application describes the geometries for equalising the respective transmission rates of the two polarisations in a grating coupler insensitive to polarisation. These geometries may or may not have a periodicity of the order two (periodicity in two dimensions in space). In any case, the geometries having a periodicity of the first order are excluded. The patent application describes, for example, a periodic grating formed by elementary patterns distributed according to a hexagonal meshing, connected to two non-orthogonal waveguides. The patent application further describes a non-periodic grating having a planar symmetry, connected to two non-orthogonal waveguides.

A grating coupler can also be cited that is insensitive to polarisation, constituted of two basic periodic gratings, each having a periodicity of the first order, and etched in the same so-called useful layer. Each basic grating is dedicated to a polarisation. A first basic grating is etched in an upper region of the useful layer. A second basic grating is etched in a lower region of the useful layer. All of the patterns of the two basic gratings are parallel to one another. A thin thickness of the useful layer separates the two basic gratings. The two waveguides extend parallel to one another, for example from the same side of the grating coupler. In this case, the useful layer would be comprised of the first coupling layer 122. Such a grating coupler is described in the article by Z. Xiao et al. entitled "*Mode Control in Planar Waveguide Grating Couplers With Double Surface Corrugation*", IEEE Photonics Technology Letters, Vol. 24, No. 19, pp. 1722-1725, of 1 Oct. 2012.

A grating coupler can also be cited that is insensitive to polarisation, constituted of a non-periodic grating corresponding to two basic uni-periodic overlapping gratings, etched in the same so-called useful layer. This in particular involves etching a first basic grating dedicated to a first polarisation, then etching a second basic grating dedicated to a second polarisation in the same place. The useful layer remains only where it has been retained both in the first and second basic gratings. In this case, the usable layer would be comprised of the first coupling layer 122. Such a grating coupler is described in the article by J. H. Song et al. entitled "Polarization-independent non-uniform grating couplers on silicon-on-insulator", Optics Letters, Vol. 40, No. 17, p. 3941, of 1 Sep. 2015.

FIG. 1C shows, in an overhead view, the second coupling layer 132.

This layer comprises the grating coupler 133, configured so as to implement the optical coupling of a signal centred on a second central wavelength that is different from the first central wavelength.

The grating coupler 133 is, in this case, a grating coupler that is sensitive to polarisation, arranged at the input/output of a single waveguide 134 integrated onto the substrate, in particular a single-mode waveguide.

The grating coupler 133 is constituted, in this case, from a series of patterns distributed with a periodicity of the first order, and according to a distribution pitch $P_i$. Thus, all of the patterns extend over the entire width of the grating coupler, the width of the grating coupler being capable of denoting one or the other of the dimensions of the grating coupler except for the thickness thereof.

The patterns are, in this case, holes in the second coupling layer 132 (filled with the material of the encapsulating layer 140).

In this case, the holes have a rectangular cross-section. This example of the shape of the holes is not limiting.

Again, the grating coupler 133 advantageously has a rectangular or square shape, in this case a square shape.

The waveguide 134 extends orthogonally to one of the sides of this square, halfway along this side of the square.

An adaptor 135, or "taper", extends between the grating coupler 133 and one end of the waveguide 134, with a width that gradually decreases from the side thereof adjacent to the grating coupler 133 to the side thereof adjacent to the waveguide 134.

The grating coupler 133, the waveguide 134 and the adaptor 135 are each formed by etching the second coupling layer 132, and filling the etched spaces with the material of the encapsulating layer 140.

The grating coupler 133 described in this case is a grating coupler that is sensitive to polarisation, in that it is suitable for coupling only one of the two polarisations of a signal centred on the second central wavelength, the polarisations of this signal being considered at the level of an optical fibre situated above the grating coupler 133. This polarisation circulates in the waveguide 134.

Numerous known alternative embodiments of a grating coupler sensitive to polarisation can be implemented without leaving the scope of the invention. A grating coupler sensitive to polarisation generally has a periodicity of the first order.

In operation, the optical coupling device 100 produces an optical coupling between one or more optical fibre(s) arranged above the stack of grating couplers 123, 133 (preferably a single optical fibre), and photonic circuits.

Each coupling stage is dedicated to the optical coupling of a single portion of the spectrum, centred on a predetermined central wavelength.

Preferably, the central wavelengths of the different coupling stages are each different from one another. The central wavelength of a coupling stage is fixed, for example, by the pitch of the corresponding grating coupler.

The invention further relates to alternative embodiments comprising three or more coupling stages. A coupling layer corresponds to each coupling stage, in which coupling layer recesses are etched in order to form a grating coupler, at least one waveguide, and advantageously a taper at each interface between the grating coupler and a waveguide.

Each coupling stage comprises a grating coupler, at least one of which being insensitive to polarisation.

Preferably, each coupling stage comprising a grating coupler insensitive to polarisation is dedicated to receiving a signal, i.e. to the transfer of a signal from an optical fibre to photonic circuits.

A multi-spectral optical coupling device can thus be produced, which is suitable for the optical coupling of a plurality of portions of the optical spectrum.

This plurality of portions of the optical spectrum can jointly form a single spectral band, the device thus forming a wide band optical coupler, in particular a wide band optical coupler that is insensitive to polarisation. In particular, a bandwidth at −1 dB of greater than or equal to 50 nm is achieved, and even greater than or equal to 70 nm, or even greater than or equal to 80 nm and even greater than or equal to 100 nm, allowing very high data transmission speeds to be achieved. According to this embodiment, the device according to the invention comprises at least two coupling stages in which the grating coupler is a grating coupler insensitive to polarisation. Preferably, these two coupling stages are each dedicated to receiving a signal, i.e. to the transfer of a signal from an optical fibre to photonic circuits.

Alternatively, this plurality of portions of the optical spectrum can be spaced apart from one another, for example in order to simultaneously couple an emitting spectral band and a receiving spectral band.

Throughout the text, the term 'emission' relates to the direction in which the light travels from the photonic circuits to an optical fibre above the optical coupling device, and the term 'receipt' refers to the direction in which the light travels from an optical fibre above the optical coupling device to the photonic circuits.

Preferably, for at least one pair of two coupling stages, and even for all pairs of two coupling stages of a device according to the invention, the difference between the respective maximum transmission rates of the two stages is less than 1 dB.

The coupling layers are separated in pairs by interlayers 121, 131.

Each of the interlayers 121, 131 has an optical index that is less than the respective optical index of each coupling layer 122, 132 at the central coupling wavelengths.

This document will now describe the thicknesses of these interlayers.

The intermediate interlayer 131 has a thickness that lies in the range 0.5 µm to 0.6 µm, for example 0.56 µm. (This thickness does not take into account the etched spaces of the first coupling layer 121, filled with the material of the interlayer 131).

This thickness maximises the transmission of a light beam at the first central wavelength through this interlayer 131 as far as the first grating coupler 123.

In practice, an optimal thickness of the interlayer 131 can be determined from measurements or simulations on a simple stack of a substrate, a layer of silica and a coupling stage at said first central wavelength. The coupling stage receives a grating coupler and a waveguide. Changes in the transmission rate in the waveguide are determined as a function of the thickness of the silica layer. A thickness of the silica layer associated with a low transmission rate in the waveguide is selected, for example associated with a minimum transmission rate. This corresponds to high losses to the layer situated below the silica. In the optical coupling device according to the invention, the layer situated below the silica receives the grating coupler 123.

In a more general manner, the thickness of each interlayer is determined so as to maximise a transmission rate, through this layer, of one or more light beams, where each light beam is centred on the central wavelength of the at least one grating coupler situated below said interlayer.

Throughout the text, the terms "above" and "below" refer to a vertical axis orthogonal to the plane of the substrate and oriented away from the substrate towards the coupling stages.

Where applicable, the thickness of the intermediate interlayer 131 can be chosen such that it also reflects a light beam at the second central wavelength towards the second coupling stage. Measurements or simulations are thus also used on a stack such as that defined above, with a coupling stage this time at the second central wavelength. A thickness is chosen that corresponds both to a low transmission rate for the stack associated with the first central wavelength, and a high transmission rate for the stack associated with the second central wavelength.

The initial interlayer 121 has a thickness that lies in the range 0.75 µm to 0.95 µm, for example 0.84 µm.

This thickness maximises the coupling of a light beam at the first central wavelength in the first grating coupler 123.

The optimal thickness of the initial interlayer 121 is in particular a thickness that maximises a reflection rate towards the upper layers, in order to recover as much light as possible in the first grating coupler 123.

In practice, an optimal thickness of the initial interlayer 121 can be determined from measurements or simulations on a simple stack of a substrate, a layer of silica and a coupling stage at said first central wavelength, as described above. A thickness of the silica layer associated with a high transmission rate in the waveguide is selected, for example associated with a maximum transmission rate.

In a more general manner, the thickness of each interlayer (initial interlayer or other) can be adapted in order to also maximise a coupling rate in the grating coupler directly above.

The thickness of the initial interlayer 121 also affects the coupling rate in the grating coupler 133.

This thickness can be adjusted so as to equalise the coupling rates in the grating couplers 123 and 133, by using measurements or simulations:

on a first stack such as that defined above associated with the first central wavelength; and on a second stack such as that defined above associated with the second central wavelength.

For this purpose, a thickness is selected for the initial interlayer 121 associated with both a high transmission rate in the waveguide of the first stack, and a medium transmission rate in the waveguide of the second stack. Losses can thus be equalised at the two central wavelengths, the first relating to the passage through the upper layers before reaching the dedicated grating coupler, the others relating to the value of the thickness of the initial interlayer 121.

Alternatively, the same measurements or simulations can be used to select a thickness of the layer 121 associated with a maximum transmission both at the first and second central wavelengths.

The respective thicknesses of the different interlayers thus offer parameters for adjusting the coupling rates of each portion of the spectrum in the corresponding coupling stage.

The optimal thicknesses are generally non-negligible and greater than or equal to 300 nm.

Each grating coupler can be apodised at the one or more interface(s) with the one or more corresponding waveguide(s).

Apodisation is used to reduce the losses at the interface between a waveguide and the grating coupler, by gradually modifying the arrangement of the patterns when approaching the waveguide.

For example, for a waveguide such as that shown in FIG. 1C, apodisation of the grating coupler 133 consists of gradually widening the silicon bars when approaching the adapter 135, in a region of the grating coupler situated on the side nearest the adapter 135.

For linguistic simplification, a grating is always considered in this text to be periodic, even when the patterns are modified at the ends by apodisation.

For example, the grating coupler situated the closest to the substrate is apodised, whereas the grating coupler situated the furthest from the substrate is not. The losses linked to the coupling between the grating coupler and the waveguide are higher in the non-apodised grating coupler situated the furthest from the substrate. The losses linked to the passage through layers covering the grating coupler are higher on the grating coupler situated the closest to the substrate, with apodisation. Apodisation of one or more grating coupler(s) thus allows the coupling rates to be equalised in the different coupling stages.

The optical coupling device according to the invention can be produced from a stack of Silicon On Insulator or SOI comprising, superimposed on one another, the substrate 110, a layer of silicon dioxide forming the first interlayer 121, and a layer of silicon.

The production method comprises the steps of:

etching the silicon layer to form the first coupling layer 122 comprising in particular a grating coupler and at least one waveguide;

depositing an encapsulating layer made of silicon dioxide and chemical-mechanical planarisation, then depositing or transferring on the encapsulating layer a layer of silicon that can be crystalline, polycrystalline or amorphous, and etching to form a grating coupler and at least one waveguide, this sequence of sub-steps being implemented one or more times depending on the desired number of coupling stages; and depositing a final encapsulating layer made of silicon dioxide.

Figure 2:
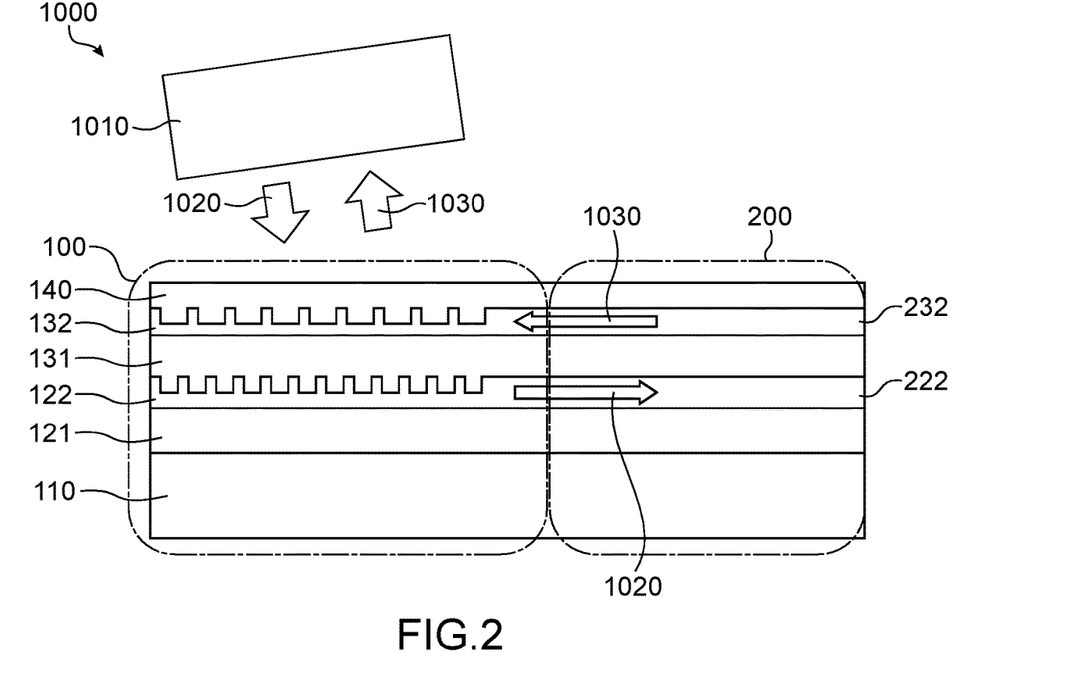
FIG. 2 shows a system comprising the optical coupling device according to the first embodiment of the invention, and photonic circuits for signal processing.

FIG. 2 shows a first example of a complete system 1000 comprising an optical coupling device according to the invention and photonic circuits, integrated onto the same substrate 110.

The photonic circuits are arranged into a plurality of superimposed processing stages, where each processing stage extends to the same height above the substrate as a coupling stage of the optical coupling device, at the input or output of this coupling stage. The system is thus arranged in superimposed stages, where each stage is dedicated to a single central coupling wavelength.

The arrangement of the photonic circuits into superimposed stages, with a single central wavelength processed at each stage allows each stage to be independent from the others.

In the example in FIG. 2, the optical coupling device corresponds to the device 100 shown in FIGS. 1A to 1C.

The photonic circuits 200 and the optical coupling device 100 are produced from the same 501 and jointly share the same substrate 110 and the same first interlayer 121.

The first coupling stage 122 of the device 100 is arranged at the input of a first processing stage 222 of the photonic circuits 200.

The first processing stage 222 is dedicated to processing the two polarisations of a signal 1020 centred on the first central wavelength, in this case 1,550 nm.

This signal 1020 originates from an optical fibre 1010, which extends substantially orthogonally to the plane of the substrate (inclined at 8° from the normal to this plane), above the optical coupling device 100.

The optical fibre 1010 is not necessarily a polarisation-maintaining fibre. Power transfers from one polarisation of the signal 1020 to the other can thus take place within the optical fibre 1010.

These power transfers are not problematic, since the first coupling stage 122 receives a grating coupler that is insensitive to polarisation. It thus transfers the two polarisations of the signal 1020 from the optical fibre 1010 to the first processing stage 222. The grating pitch is, in this case, 0.605 µm.

These two polarisations are processed upon receipt by the first processing stage 222, for example by demodulations in order to extract information encoded in the signal 1020.

At the stage above, the photonic circuits 200 comprise a second processing stage 232, dedicated to processing a signal centred on the second central wavelength, in this case 1,310 nm.

This signal 1030 can be generated by a source integrated into the second processing stage 232, or transmitted to the second processing stage.

After processing, in particular a modulation of the signal for integration therein of the data to be transmitted, the signal 1030 is coupled to an optical fibre. This coupling is performed by the second coupling stage 132, arranged at the output of the second processing stage 232. The optical fibre is preferably the same optical fibre 1010 as that carrying the signal 1020. The grating pitch in the second coupling stage 132 is equal to 0.5 µm.

The second coupling stage 132 receives a grating coupler sensitive to polarisation, which is not problematic since this time it involves coupling to the optical fibre 1010, and not from the optical fibre 1010. The use of a grating coupler sensitive to polarisation produces excellent coupling performance levels, for example less than 1.8 dB of loss, and even less than 1.5 dB, or less than 1 dB of loss.

It can therefore be seen that the optical coupling device 100 thus forms an optical emitting and receiving coupler, allowing for the coupling of both one portion of the spectrum in emission, and one portion of the spectrum in reception. It in particular allows these two portions of the spectrum to be carried by the same optical fibre 1010.

It should be noted that the second interlayer 131, as well as the encapsulating layer 140, extend both in the optical coupling device 100 and in the photonic circuits 200.

Figure 3:
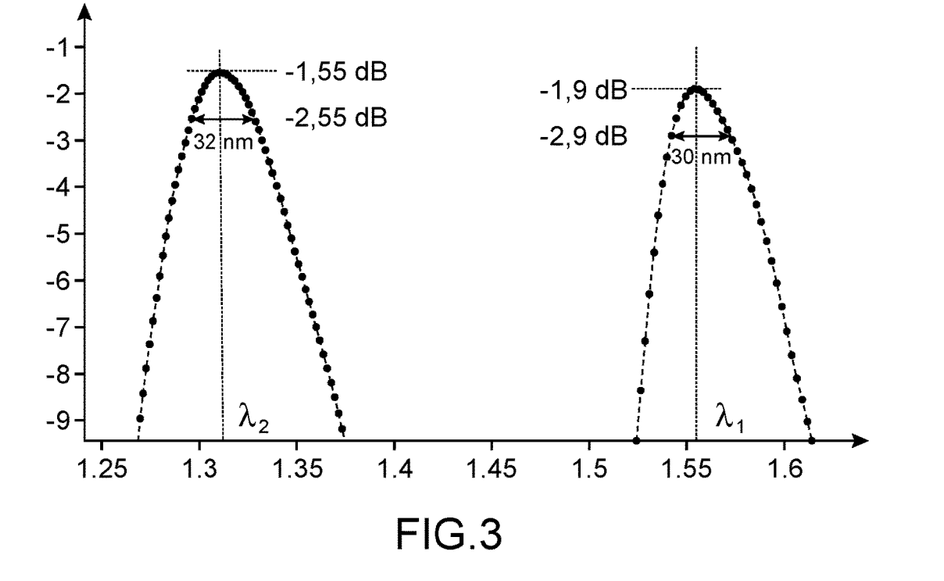
FIG. 3 shows a transmission rate as a function of the wavelength in an optical coupling device according to the first embodiment of the invention.

FIG. 3 shows the performance levels of the device 100 according to the invention, integrated into the system 1000 in FIG. 2.

The abscissa corresponds to a wavelength in µm.

The ordinate is a transmission rate from the fibre to the waveguides of each coupling stage in dB.

The device 100 has a first transmission peak, centred on the first central wavelength $\lambda_1$, at about 1,550 nm (in this case 1,554 nm), and a second transmission peak, centred on the second central wavelength $\lambda_2$, at about 1,310 nm (in this case 1,311 nm).

The peak centred on $\lambda_1$ has a maximum transmission of −1.9 dB, and a bandwidth at −1 dB (i.e. −1.9−1=−2.9 dB) of 30 nm.

The peak centred on $\lambda_2$ has a maximum transmission of −1.55 dB, and a bandwidth at −1 dB (i.e. −1.55−1=−2.55 dB) of 32 nm.

These performance levels correspond to the sum of the transmissions of a standard coupler dedicated to $\lambda_1$ only, and of a standard coupler dedicated to $\lambda_2$ only.

The two transmission peaks thus have substantially the same maximum transmission, with less than 1 dB difference between the two respective maximum values thereof.

They also have substantially the same bandwidth at −1 dB.

Alternatively, one central wavelength is equal to about 1,310 nm, and the other is equal to about 1,490 nm.

Figure 4A:
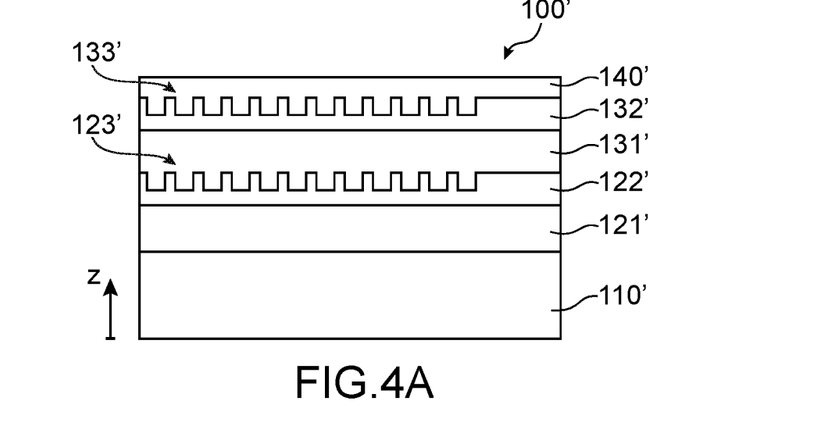
FIGS. 4A to 4C show a second embodiment of an optical coupling device according to the invention.
Figure 4B:
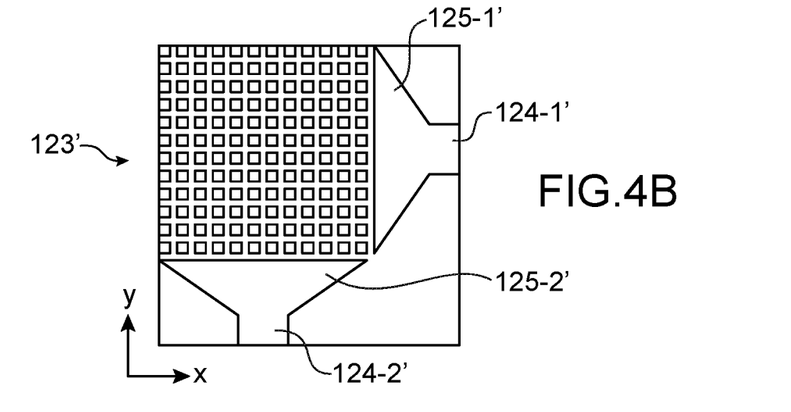
Figure 4C:
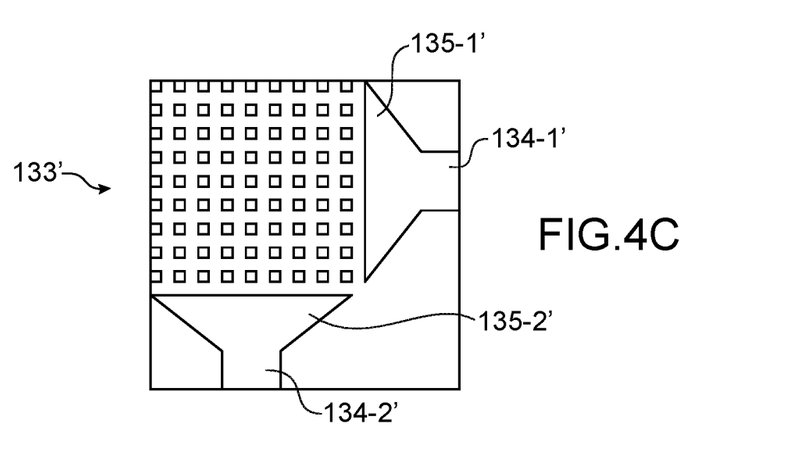

FIGS. 4A to 4C show a second embodiment of an optical coupling device according to the invention.

The reference numerals in FIGS. 4A to 4C correspond to those in FIGS. 1A to 1C to which an apostrophe has been added.

The optical coupling device 100' is differs from the optical coupling device 100 only in that the second coupling stage is also insensitive to polarisation.

It thus receives a grating coupler insensitive to polarisation 133'. This grating coupler 133' is arranged at the input/output of two waveguides 134-1', 134-2'. Respective adapters 135-1', 135-2' each extend between the grating coupler 133' and a waveguide 134-1', respectively 134-2'.

The gratings coupler 123' and 133' are shown here in a diagrammatic manner. The similarity of the grating pitches, relative to the gratings coupler shown in FIG. 1A to 1C, is not necessarily representative of reality.

Again, the thickness of the intermediate interlayer 131 is adapted so as to maximise the light power received by the lower grating coupler 123'. In this case, this thickness is 920 nm.

In order to maximise the bandwidth at −1 dB of such an optical coupling device, it is important that the maximum transmissions of the different coupling stages are similar to one another. Different means have been described hereinabove for equalising these maximum transmissions, for example the apodisation of the lower grating coupler 123' only.

Figure 5:
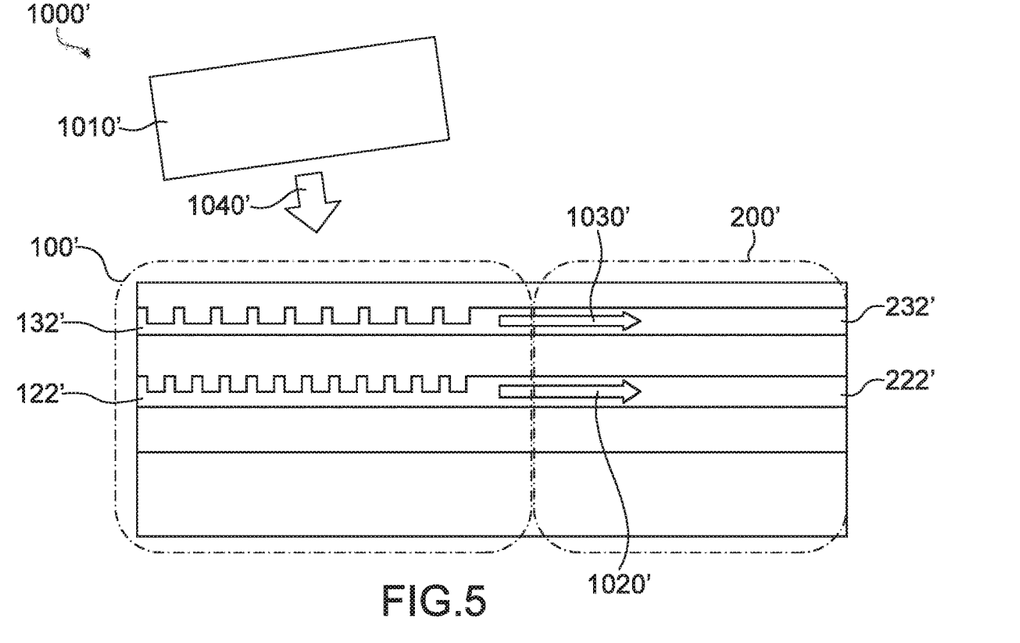
FIG. 5 shows a system comprising the optical coupling device according to the second embodiment of the invention, and photonic circuits for signal processing.

FIG. 5 shows a second example of a complete system 1000' comprising an optical coupling device 100' and photonic circuits integrated onto the same substrate 110'.

The system 1000' will only be described with regard to its differences relative to the system 1000 in FIG. 2.

In this case, the system 1000' operates in reception only.

The optical fibre 1010' carries a broadband signal 1040' to the optical coupling device 100'.

Each coupling stage of the device 100' couples a given spectrum portion of the broadband signal 1040' to dedicated processing circuits.

In particular, the first coupling stage 122' produces the optical coupling, between the optical fibre 1010' and a first processing stage 222', of a signal 1020' centred on the first central wavelength, in this case 1,380 nm.

Similarly, the second coupling stage 132' produces the optical coupling, between the optical fibre 1010' and a second processing stage 232', of a signal 1030' centred on the second central wavelength, in this case 1,320 nm.

The signals 1020' and 1030' jointly form the broadband signal 1040'.

The first processing stage 222' is dedicated to processing the two polarisations of the signal 1020' (for example demodulations for extracting information encoded in the signal 1020').

The second processing stage 232' is dedicated to processing the two polarisations of the signal 1030' (for example demodulations for extracting information encoded in the signal 1030').

It can therefore be seen that the optical coupling device 100' thus forms a wide band optical coupler insensitive to polarisation, for coupling the different spectrum portions of a broadband signal. The optical coupling device 100' has a bandwidth at −1 dB of greater than or equal to 50 nm, and even greater than or equal to 70 nm, or even greater than or equal to 80 nm (width of the maximum value of the transmission, minus 1 dB).

According to one alternative embodiment, not shown, the optical coupling device can further comprise two other coupling stages sensitive to polarisation. The two stages insensitive to polarisation are dedicated to receiving a signal originating from a first optical fibre. The two stages sensitive to polarisation are dedicated to emitting a signal to a second optical fibre. The first and second optical fibres are advantageously different from one another. When the emission and reception are at different wavelengths, the one and same optical fibre can be used in replacement of the first and second optical fibres.

Figure 6:
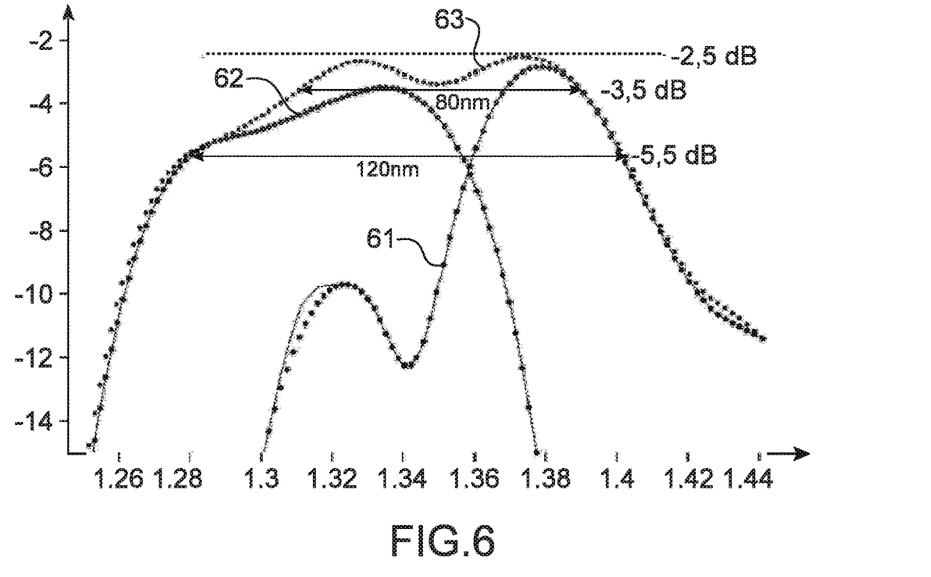
FIG. 6 shows a transmission rate as a function of the wavelength in an optical coupling device of the type according to the second embodiment of the invention.

FIG. 6 shows the performance levels of a device of the type of the device 100' according to the invention, integrated into the system 1000' of FIG. 5.

In order to limit the resources required for the simulation shown in FIG. 6, the performance levels of a device of the type of the device 100' were simulated, however in which device each coupling stage comprises a uni-periodic grating coupler, thus sensitive to polarisation. Nonetheless, the results shown in FIG. 6 provide a good schematic illustration of the performance levels of a device according to the invention.

The abscissa corresponds to a wavelength in μm.

The ordinate is a transmission rate from the fibre to the waveguides of each coupling stage in dB.

The first coupling stage has a transmission shown by the graph 61, centred on about 1,380 nm.

The second coupling stage has a transmission shown by the graph 62, centred on about 1,320 nm.

The two coupling stages have substantially the same maximum transmission (−3.5 dB, respectively −3 dB).

The device comprising these two coupling stages thus has a transmission shown by the graph 63, with a maximum transmission of −2.5 dB, a bandwidth at −1 dB (i.e. −2.5−1=−3.5 dB) of 80 nm, and a bandwidth at −3 dB (i.e. −2.5−3=−5.5 dB) of 120 nm.

The invention further relates to a method of using an optical coupling device according to the invention to produce a wide band coupling insensitive to polarisation (bandwidth at −1 dB of greater than or equal to 50 nm, and even greater than or equal to 80 nm) or to produce an emitting and receiving coupling with the same optical fibre.

Numerous alternative embodiments can be adopted without leaving the scope of the invention. For example, a reflective metallic layer or a Bragg mirror can extend between the coupling stages and the substrate.

The position of the coupling stages on top of one another can also be reversed. In particular, the position of the coupling stages dimensioned in order to each operate at different respective wavelengths can be reversed.

The invention claimed is:

1. An optical coupling device for producing an optical coupling at at least two central wavelengths, between an optical fiber and photonic circuits, comprising:
    a substrate and at least two coupling stages integrated onto the substrate; and wherein:
    each coupling stage comprises, integrated onto the substrate, a grating coupler and at least one waveguide, the grating coupler being arranged at an input or output of the at least one waveguide and configured to implement an optical coupling centered on a respective central wavelength; and
    the grating couplers are superimposed one above the other, according to an axis orthogonal to the plane of the substrate;
    and wherein the at least two coupling stages comprise a first coupling stage comprising a first grating coupler insensitive to polarization, and associated with a first central wavelength; and
    a second coupling stage comprising a second grating coupler, and associated with a second central wavelength different from the first wavelength.

2. A device according to claim 1, further comprising an initial interlayer and/or at least one intermediate interlayer, wherein the initial interlayer extends between the substrate and an immediately neighbouring coupling stage, and each intermediate interlayer extends between two coupling stages.

3. A device according to claim 2, wherein each interlayer has a thickness greater than 300 nm.

4. A device according to claim 2, wherein each interlayer is made of silica.

5. A device according to claim 1, wherein the coupling stage situated closest to the substrate includes an apodized grating coupler, and the coupling stage situated furthest from the substrate includes a non-apodized grating coupler.

6. A device according to claim 1, wherein each coupling stage is associated with a respective maximum of transmission rate of the optical coupling implemented by the corresponding grating coupler, and wherein for at least one pair of two coupling stages, the difference between the corresponding respective maxima is less than 1 dB.

7. A device according to claim 1, wherein:
    the first coupling stage comprises the first grating coupler insensitive to polarization, associated with the first central wavelength and a first maximum of the transmission rate of the optical coupling implemented by the grating coupler; and
    the second coupling stage comprises the second grating coupler insensitive to polarization, associated with the second central wavelength and a second maximum of the transmission rate of the optical coupling implemented by the grating coupler;
    the difference between the first and second central wavelengths being less than or equal to 100 nm, and the difference between the first and the second maximum of the transmission rates being less than or equal to 1 dB, the optical coupling device thus forming a wide band coupler insensitive to polarization with a bandwidth at −1 dB that is greater than or equal to 50 nm.

8. A device according to claim 1, comprising the difference between the first and second central wavelengths being greater than or equal to 130 nm.

9. A device according to claim 8, wherein the first central wavelength lies in a range of 1,540 to 1,560 nm, and the second central wavelength lies in a range of 1,300 to 1,320 nm.

10. A device according to claim 1, wherein the number of coupling stages is equal to two.

11. An optical system comprising, integrated onto a same substrate, an optical coupling device according to claim 1 and photonic circuits, wherein the photonic circuits are arranged in a plurality of superimposed processing stages, and wherein to each coupling stage of the optical coupling device corresponds a processing stage.

12. A system according to claim 11, wherein:
    the first coupling stage is arranged at an input of a first processing stage, configured to process a signal centered on the first central wavelength and received by the system via the optical coupling device; and
    the second coupling stage is arranged at an input of a second processing stage, configured to process a signal centered on the second central wavelength and received by the system via the optical coupling device.

13. A system according to claim 12, further comprising a single emitting and receiving fiber, configured to transmit a broadband signal to the photonic circuits via the optical coupling device, the broadband signal being formed by the signal centered on the first central wavelength and the signal centered on the second central wavelength.

14. A system according to claim 11, wherein:
    the first coupling stage is arranged at an input of a first processing stage, configured to process a signal centered on the first central wavelength and received by the system via the optical coupling device; and
    the second coupling stage is arranged at an output of a second processing stage, configured to process a signal centered on the second central wavelength and intended to be emitted by the system via the optical coupling device.

15. A system according to claim 14, further comprising a single emitting and receiving fiber, configured to:

transmit the signal centered on the first central wavelength to the first processing stage via the optical coupling device; and receive the signal centered on the second central wavelength from the second processing stage via the optical coupling device.

16. A device according to claim 1, comprising the second grating coupler being sensitive to polarization.

* * * * *